(12) United States Patent
Fujimoto

(10) Patent No.: US 10,014,745 B2
(45) Date of Patent: Jul. 3, 2018

(54) ELECTRIC DRIVING DEVICE AND ELECTRIC POWER STEERING DEVICE

(71) Applicant: Hitachi Automotive Systems, Ltd., Hitachinaka-shi, Ibaraki (JP)

(72) Inventor: Masao Fujimoto, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/543,002

(22) PCT Filed: Jan. 29, 2016

(86) PCT No.: PCT/JP2016/052666
§ 371 (c)(1),
(2) Date: Jul. 12, 2017

(87) PCT Pub. No.: WO2016/125700
PCT Pub. Date: Aug. 11, 2016

(65) Prior Publication Data
US 2018/0006521 A1    Jan. 4, 2018

(30) Foreign Application Priority Data
Feb. 5, 2015  (JP) .................................. 2015-021209

(51) Int. Cl.
*H02K 11/30* (2016.01)
*H02K 5/22* (2006.01)
(Continued)

(52) U.S. Cl.
CPC ........... *H02K 5/225* (2013.01); *B60R 16/023* (2013.01); *B62D 5/0406* (2013.01); *B62D 5/046* (2013.01);
(Continued)

(58) Field of Classification Search
CPC . H02K 5/22; H02K 11/33; H02K 5/02; H02K 5/10; H02K 5/225; B62D 5/04; B62D 5/0406; B62D 5/046; B60R 16/023
(Continued)

(56) References Cited

U.S. PATENT DOCUMENTS

| 4,143,288 A * | 3/1979 | Sato .......................... H02K 7/04 310/154.04 |
| 9,780,619 B2 * | 10/2017 | Fujimoto .................. H02K 5/22 |
| 2007/0178723 A1 * | 8/2007 | Kataoka .................... H02K 3/50 439/76.2 |

FOREIGN PATENT DOCUMENTS

| JP | 2007-209101 A | 8/2007 |
| JP | 2013-60119 A | 4/2013 |

(Continued)

OTHER PUBLICATIONS

JPO machine translation Harada, Kazuki, May 2013, JP 2013106376 A, all pages.*

(Continued)

*Primary Examiner* — Naishadh Desai
(74) *Attorney, Agent, or Firm* — Crowell & Moring LLP

(57) ABSTRACT

The present invention is configured such that an electronic control assembly is divided into a power-supply circuit unit mounted on a metal substrate, a power-conversion circuit unit mounted on a metal substrate, and a control circuit unit mounted on a resin substrate; a power-supply-connector wiring part, which supplies electric power from the power-supply circuit unit to the power-conversion circuit unit and the control circuit unit, and a signal-transmission-connector wiring part, which transmits signals to be input to or output from the control circuit unit, are embedded in a connector terminal assembly; and connector terminals of the power-supply-connector wiring part and the signal-transmission-connector wiring part, which are exposed from the connector (Continued)

terminal assembly, are directly connected to the corresponding circuit units.

14 Claims, 8 Drawing Sheets

(51) Int. Cl.
B60R 16/023 (2006.01)
B62D 5/04 (2006.01)
H02K 5/10 (2006.01)
H02K 11/33 (2016.01)
H02K 5/02 (2006.01)

(52) U.S. Cl.
CPC .................. H02K 5/02 (2013.01); H02K 5/10 (2013.01); H02K 11/33 (2016.01)

(58) Field of Classification Search
USPC .................................................. 310/89, 68 D
See application file for complete search history.

(56) References Cited

FOREIGN PATENT DOCUMENTS

JP 2013-106376 A 5/2013
JP 2013106376 A * 5/2013

OTHER PUBLICATIONS

International Search Report (PCT/ISA/210) issued in PCT Application No. PCT/JP2016/052666 dated May 10, 2016 with English-language translation (three (3) pages).

Japanese-language Written Opinion (PCT/ISA/237) issued in PCT Application No. PCT/JP2016/052666 dated May 10, 2016 (four (4) pages).

* cited by examiner

ELECTRIC DRIVING DEVICE AND ELECTRIC POWER STEERING DEVICE

TECHNICAL FIELD

The present invention relates to an electric driving device and an electric power steering device, and specifically to an electric driving device and an electric power steering device, both provided with a built-in electronic control unit.

BACKGROUND ART

In the general industrial machinery fields, a mechanical-system control element is driven by an electric motor. However, in recent years, there have been proposed and developed various mechanically and electrically integrated electric driving devices, in which an electronic control unit that is configured to control a rotational speed and a rotational torque of an electric motor and comprised of a semiconductor device or the like, is integrally incorporated in the electric motor.

For instance in an automotive electric power steering device exemplified as a mechanically and electrically integrated electric driving device, both of a rotational direction and a rotational torque of a steering shaft, which is rotated by operating a steering wheel by the driver, are detected. The automotive electric power steering device is configured to drive the electric motor so as to rotate the steering shaft in the same direction as the rotational direction of the steering shaft on the basis of the detected values, thereby generating a steering assist torque. In order to control the electric motor, an electronic control unit (ECU: Electronic Control Unit) is provided or incorporated in the power steering device.

As a prior-art electric power steering device, Japanese patent provisional publication No. JP2013-60119 A (Patent document 1) discloses such an electric power steering device. Disclosed in the Patent document 1 is an electric power steering device, which is constructed by an electric motor and an electronic control unit. The electric motor is housed in a motor housing having a cylindrical portion made of aluminum alloy or the like, whereas the electronic control unit is housed in an ECU housing, which is located on the opposite side to an output shaft in an axial direction of the motor housing. The electronic control unit, which is housed in the ECU housing, is equipped with a power-supply circuit unit, a power-conversion circuit unit having a power switching element, such as a MOSFET, an IGBT or the like, for driving and controlling the electric motor, and a control circuit unit for controlling the power switching element. An output terminal of the power switching element and an input terminal of the electric motor are electrically connected to each other through a bus bar.

Electric power is supplied from a power source through a connector terminal assembly made of synthetic resin to the electronic control unit, which is housed in the ECU housing. Also, detection signals from detection sensors, representing operating conditions and the like, are supplied to the electronic control unit. The connector terminal assembly also functions as a lid body. Hence, the connector terminal assembly is connected to the electronic control unit in a manner so as to close an opening formed in the ECU housing. Also, the connector terminal assembly is fixedly connected to an outside surface of the ECU housing with fixing bolts.

As other electric driving devices, in which an electronic control unit is integrally incorporated, an electric brake, electric hydraulic controllers (regulators) for various hydraulic controls and the like are well known.

CITATION LIST

Patent Literature

Patent document 1: Japanese patent provisional publication No. 2013-60119 (A)

SUMMARY OF INVENTION

Technical Problem

By the way, the electric power steering device disclosed in the Patent document 1 is located in the engine room of an automotive vehicle, and thus a small-size configuration is required. In particular, the recent trend is for a large number of accessories such as exhaust emission control apparatus, safety measure apparatus and the like to be installed in the engine room of the automotive vehicle. Hence, a variety of accessories as well as the electric power steering device have to be reduced in size as much as possible. Additionally, it is required to reduce the number of component parts.

In the electric power steering device having the configuration as disclosed in the Patent document 1, the power-supply circuit unit, the power-conversion circuit unit, and the control circuit unit are mounted on two substrates in total. On the other hand, the number of electrical components needed to control the electric motor has roughly been decided. Hence, when mounting the required number of electrical components on these two substrates, as a matter of course, the radial size of the ECU housing, in which the electronic control unit is housed, tends to be increased or enlarged. Structurally, in the electric power steering device, the limitation on its axial length is relatively smaller, but there is a tendency for enlargement of its radial size to be limited. Therefore, it would be desirable to reduce the size of the aforesaid housing in the radial direction.

To realize this, that is, to reduce the radial size, it is effective to utilize such a configuration that the power-supply circuit unit, the power-conversion circuit unit, and the control circuit unit are divided into three individual sections. According to this three-divided configuration, electrical components needed to control the electric motor are also divided into three, and thus the area of each individual substrate can be reduced as compared to a two-divided configuration, thereby reducing the radial size.

However, for the purpose of supplying electric power, control signals and the like to the three-divided individual substrates, the three-divided configuration also requires a complicated connector-wiring-part configuration that uses a large number of relay connectors. This leads to several problems such as increased number of component parts and difficulty in downsizing. Additionally, the complicated connector-wiring-part configuration leads to a further problem such as increased assembly man-hour, in other words, a rise in unit price of product.

It is, therefore, in view of the previously-described drawbacks of the prior art, an object of the invention to provide a new electric driving device and a new electric power steering device, configured to suppress a housing, in which an electronic control unit is housed, from being enlarged in the radial direction, and supply electric power and control signals to the power-supply circuit unit, the power-conversion circuit unit, and the control circuit unit by a connector terminal assembly having a simplified configuration that enables reduced number of relay connectors.

Solution to Problem

In order to accomplish the aforementioned and other objects, the device of the present invention is characterized in that an electronic control assembly is divided into a power-supply circuit unit having a main function that generates a power supply and mounted on a metal substrate, a power-conversion circuit unit having a main function that drives an electric motor and mounted on a metal substrate, and a control circuit unit having a main function that controls the power-conversion circuit unit and mounted on a resin substrate, in that at least a power-supply-connector wiring part that supplies electric power from the power-supply circuit unit to the power-conversion circuit unit and the control circuit unit and a signal-transmission-connector wiring part that transmits signals to be input to or output from the control circuit unit are embedded in a connector terminal assembly made of synthetic resin, and in that connector terminals of the power-supply-connector wiring part and the signal-transmission-connector wiring part, which are exposed from the connector terminal assembly, are directly connected to corresponding connectors of the power-supply circuit unit, the power-conversion circuit unit, and the control circuit unit.

Advantageous Effects of Invention

According to the invention, electric components, which construct an electronic control unit, are mounted on three substrates according to respective functions, and thus it is possible to reduce the radial size of each individual substrate. Additionally, connector wiring parts, through which individual circuit units are electrically connected to each other, are assembled or gathered together on a connector terminal assembly made of synthetic resin and directly connected to the corresponding circuit units, and thus it is possible to reduce the number of components of the connector terminal assembly. As a result of this, the device of the invention can provide an advantageous effect such as simplified configuration.

DESCRIPTION OF EMBODIMENTS

Embodiments of the present invention are hereinafter described in detail with reference to the accompanying drawings. It will be understood that the invention is not limited to the particular embodiments shown and described hereunder, but that various changes and modifications may be made without departing from the inventive concept of this invention.

Figure 1:
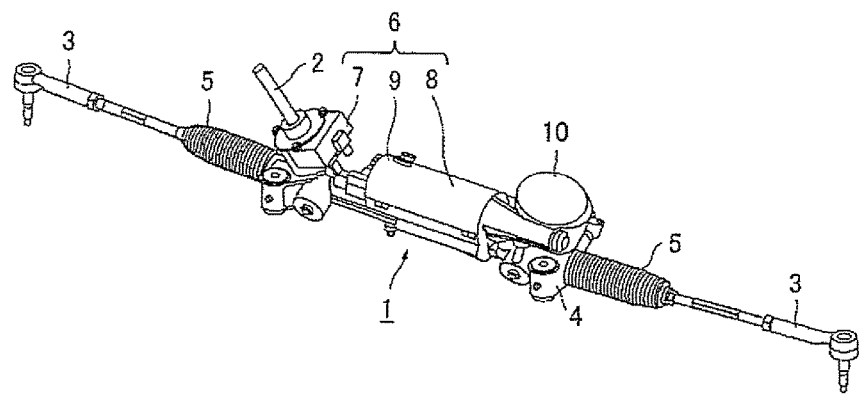
FIG. 1 is a general perspective view illustrating a steering device illustrated as one example to which the present invention is applied.
Figure 2:
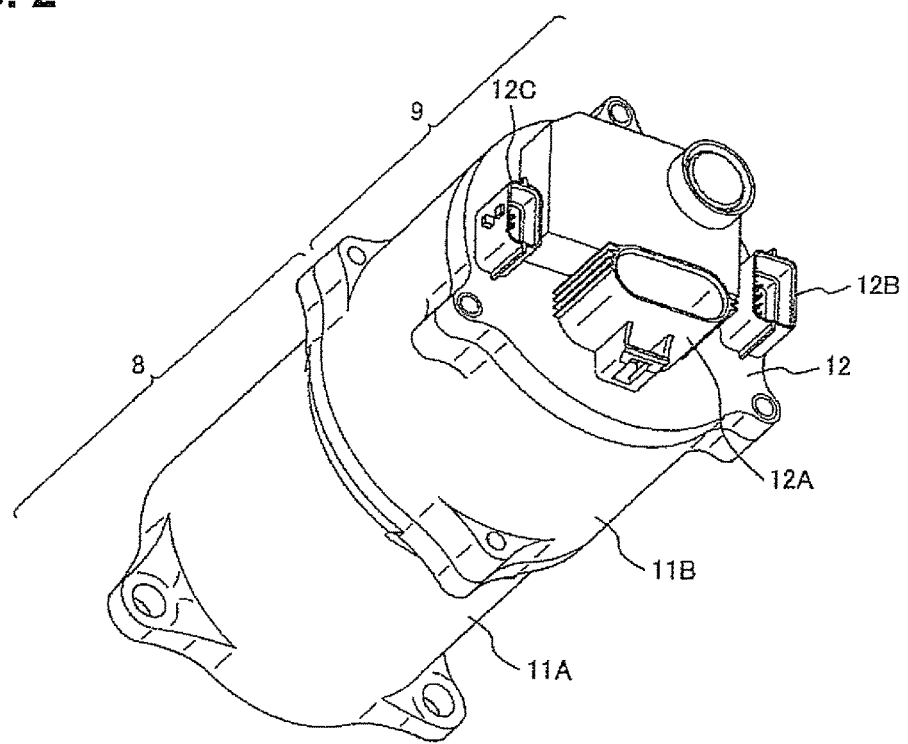
FIG. 2 is a general perspective view illustrating an electric power steering device exemplified as a mechanically and electrically integrated electric driving device.

Prior to explaining the embodiments of the invention, the configuration of a steering device illustrated as one example to which the invention is applied, and the configuration of an electric power steering device exemplified as a mechanically and electrically integrated electric driving device are described briefly with reference to FIGS. 1-2.

First of all, the steering device for steering front road wheels of an automotive vehicle is explained. The steering device 1 is constructed as shown in FIG. 1. A pinion (not shown) is provided at the lower end of a steering shaft 2, which is linked to a steering wheel (not shown). The pinion is kept in meshed-engagement with a rack (not shown) extending in a left-and-right direction of a vehicle body. Tie rods 3 are linked to both ends of the rack, for steering the front road wheels in the left-and-right direction. The rack is covered by a rack housing 4. A rubber boot 5 is provided between the rack housing and each tie rod 3.

Also provided is an electric power steering device 6 for assisting steering torque when the steering wheel is rotatably operated. Concretely, a torque sensor 7 is provided for detecting a rotational direction and a rotational torque of the steering shaft 2. Further provided are an electric-motor part 8 for applying a steering assist force based on the detected values of torque sensor 7 to the rack via a gear 10, and an electronic control unit (ECU) part 9 for controlling an electric motor located in the electric-motor part 8. The outer peripheral portion of the output-shaft side of electric-motor part 8 of electric power steering device 6 is fixedly connected to the gear 10 at three points with bolts (not shown). On the other hand, electronic control unit part 9 is provided on the opposite side to the output shaft of electric-motor part 8.

As shown in FIG. 2, electric-motor part 8 is constructed by a motor housing 11A having a cylindrical portion made of aluminum alloy or the like, and the electric motor (not shown) housed in the motor housing. On the other hand, electronic control unit part 9 is constructed by an ECU housing 11B located on the opposite side to the output shaft in an axial direction of the motor housing 11A and made of aluminum alloy or the like, and an electronic control assembly (not shown) housed in the ECU housing.

Motor housing 11A and ECU housing 11B are integrally fixed together with fixing bolts at their opposed end faces. The electronic control assembly, which is housed in the ECU housing 11B, is comprised of a power-supply circuit unit configured to generate a required power supply, a power-conversion circuit unit having a power switching element including a MOSFET (a metal oxide semiconductor FET), an IGBT (an insulated gate bipolar transistor) or the like, for driving and controlling the electric motor of electric-motor part 8, and a control circuit unit for controlling the power switching element. An output terminal of the power switching element and an input terminal of the electric motor are electrically connected to each other through a bus bar.

A lid body 12, which is made of synthetic resin and also serves as a connector terminal assembly, is fixed on another end face of ECU housing 11B with fixing bolts. Lid body 12 is equipped with a power-supply connector terminal formation part 12A, a detection-sensor connector terminal formation part 12B, and a control-state-transmission connector terminal formation part 12C for transmitting or sending out a control state to an external apparatus. Electric power is supplied from a power source through the power-supply connector terminal formation part 12A of lid body 12 made of synthetic resin to the electronic control assembly housed in the ECU housing 11B. Also, detection signals from detection sensors, representing operating conditions and the like, are supplied through the detection-sensor connector terminal formation part 12B to the electronic control assembly. Furthermore, a control-state signal, representing a current control state of the electric power steering device, is transmitted or sent out through the control-state-transmission connector terminal formation part 12C to the electronic control assembly.

Hereupon, lid body 12 is configured to cover the entire opening of ECU housing 11B. In lieu thereof, the lid body equipped with downsized connector terminals may be inserted into an insertion through hole formed in the ECU housing 11B, for electric-connection with the electronic control assembly.

In the electric power steering device 6 configured as discussed above, when steering shaft 2 is rotated in either rotational direction by operating the steering wheel, torque sensor 7 detects both a rotational direction and a rotational torque of steering shaft 2. The control circuit unit calculates a driving manipulated variable for driving the electric motor on the basis of the detected values. On the basis of the calculated driving manipulated variable, the electric motor is driven by the power switching element of the power-conversion circuit unit. As a result, the output shaft of the electric motor is driven so as to rotate the steering shaft 2 in the same direction as the rotational direction of the steering shaft. Rotary motion of the output shaft is transmitted from the pinion (not shown) through the gear 10 to the rack (not shown), and hence the automotive vehicle is steered. Detailed description of these configuration and operation of the steering device will be omitted, because they are well known.

By the way, in the electric power steering device as discussed above, a variety of accessories as well as the electric power steering device have to be reduced in size as much as possible, because the recent trend is for a large number of accessories such as exhaust emission control apparatus, safety measure apparatus and the like to be installed in the engine room of the automotive vehicle. Also, in the electric power steering device, the number of electrical components needed to control the electric motor and constructing the power-supply circuit unit, the power-conversion circuit unit, and the control circuit unit, has roughly been decided. Therefore, when mounting the required number of electrical components on two substrates in total as disclosed in the Patent document 1, as a matter of course, the radial size of the housing, in which the electronic control unit is housed, tends to be increased or enlarged.

To reduce the radial size, it is effective to divide the power-supply circuit unit, the power-conversion circuit unit, and the control circuit unit into three individual sections. According to this three-divided configuration, electrical components needed to control the electric motor are also divided into three, and thus the area of each individual substrate can be reduced as compared to a two-divided configuration, thereby reducing the radial size.

However, for the purpose of supplying electric power, control signals and the like to the three-divided individual substrates, the three-divided configuration also requires a complicated connector-wiring-part configuration that uses a large number of relay connectors. This leads to several problems such as increased number of component parts and difficulty in downsizing. Additionally, the complicated connector-wiring-part configuration leads to a further problem such as increased assembly man-hour, in other words, a rise in unit price of product.

In view of the background as discussed above, in the shown embodiment, the electric power steering device having the following configuration has been proposed.

That is to say, the electric power steering device of the embodiment is configured such that the electronic control assembly is divided into a power-supply circuit unit having a main function that generates a power supply and mounted on a metal substrate, a power-conversion circuit unit having a main function that drives an electric motor and mounted on a metal substrate, and a control circuit unit having a main function that controls the power-conversion circuit unit and mounted on a resin substrate, and that at least a power-supply-connector wiring part that supplies electric power from the power-supply circuit unit to the power-conversion circuit unit and the control circuit unit and a signal-transmission-connector wiring part that transmits signals to be input to or output from the control circuit unit are embedded in a connector terminal assembly made of synthetic resin, and that connector terminals of the power-supply-connector wiring part and the signal-transmission-connector wiring part, which are exposed from the connector terminal assembly, are directly connected to corresponding connectors of the power-supply circuit unit, the power-conversion circuit unit, and the control circuit unit.

The configuration of one embodiment of the electric power steering device according to the invention is hereunder described with reference to the following drawings, but, the shape of the lid body shown in the following drawings is somewhat modified from that of lid body 12 shown in FIG. 2. However, the lid body shown in the following drawings and the lid body 12 shown in FIG. 2 are identical in function.

Figure 3:
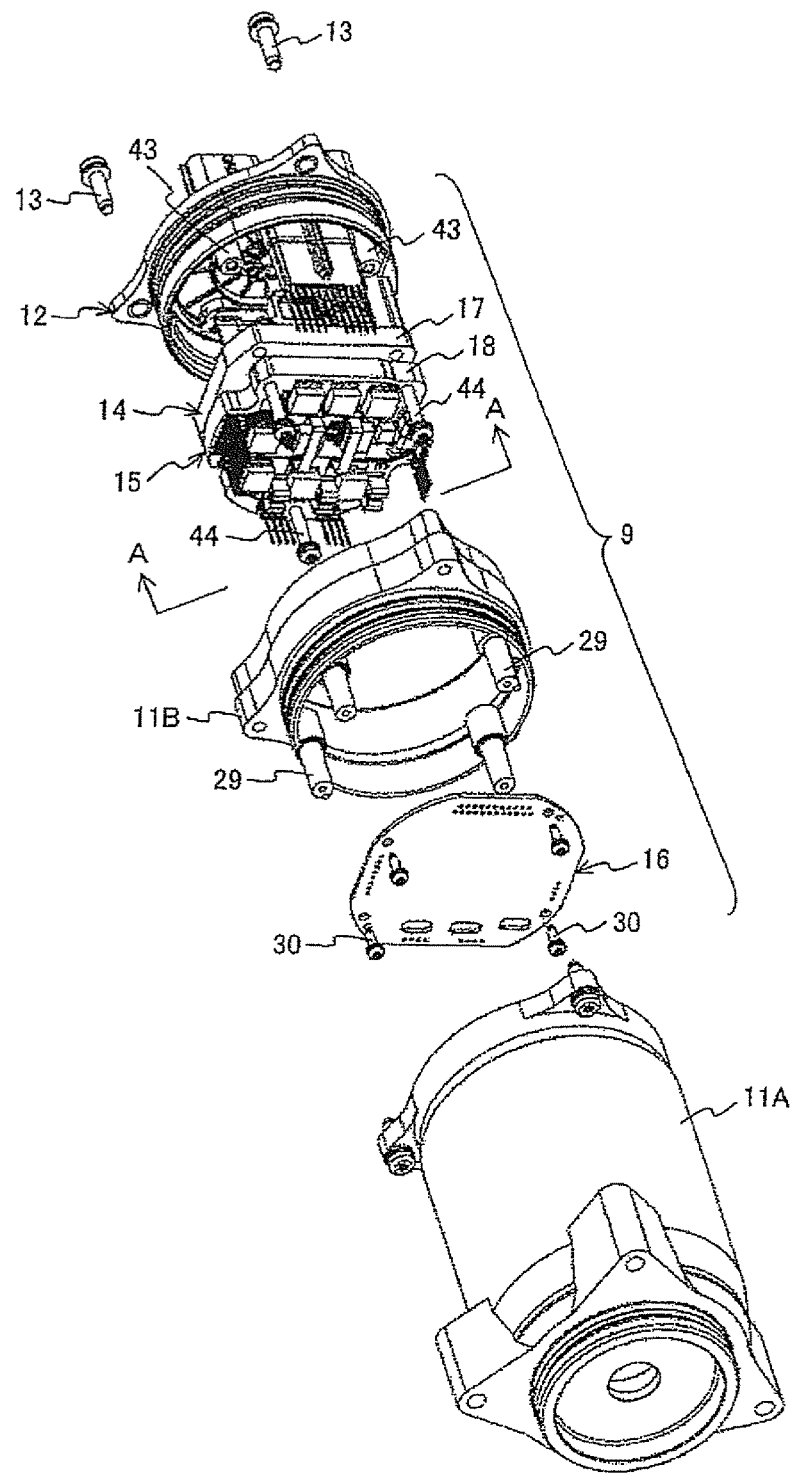
FIG. 3 is a disassembled perspective view illustrating one embodiment of the electric power steering device according to the present invention.

Referring to FIG. 3, there is shown the disassembled perspective view of electric power steering device 6. The electric motor is generally housed in the motor housing 11A. As discussed previously, motor housing 11A and ECU housing 11B are made of aluminum alloy, and formed separately from each other. In lieu thereof, these two housings may be integrally formed as a same housing.

Electronic control unit part 9 is comprised of the ECU housing 11B fixedly connected onto the opposite side to the output shaft (not shown) of the electric motor housed in the motor housing 11A, and the lid body fixedly connected to the ECU housing 11B with three fixing bolts 13. As described later, lid body 12 also serves as a connector terminal assembly. The lid body is made of synthetic resin by injection molding. By the way, various connector wiring parts (described later) are simultaneously embedded in the lid body 12 by insert molding.

The electronic control assembly, which is comprised of the power-supply circuit unit 14, the power-conversion circuit unit 15, and the control circuit unit 16 and the like, is housed in the housing space, defined by the ECU housing 11B and the lid body 12. Metal substrates 17, 18, each of which is made of a metal material such as aluminum, aluminum alloy or the like, are located in the ECU housing 11B. Electrical components, which construct the power-supply circuit unit 14 and the power-conversion circuit unit 15, are mounted on the respective metal substrates 17, 18 by single-sided mounting. As described later, these metal substrates 17, 18 also function as heat radiation members. Thus, these metal substrates are arranged in thermal-contact with the ECU housing 11B so as to dissipate or radiate heat.

That is, metal substrates 17, 18 have a heat-radiation function that dissipates or radiates heat from both the power-supply circuit unit 14 and the power-conversion circuit unit 15 to the ECU housing 11B. Hence, the inner peripheral side of ECU housing 11B and the outer peripheral side of each of metal substrates 17, 18 are structured to be kept in thermal-contact with each other.

In lieu thereof, heat from metal substrates 17, 18 may be radiated through fixing bolts (i.e., fixing bolts 44 shown in FIG. 9), by which these metal substrates are fixed to the lid body 12. In this case, an insert nut is embedded in the lid body 12, and the insert nut has only to be kept in thermal-contact with the ECU housing 11B.

Hereupon, metal substrates 17, 18 are both formed thicker, for the purpose of enhancing their radiating abilities. Also, to improve the thermal contact performance, a heat-radiation functional material having a high thermal conductivity, such as a thermally conductive adhesive, a heat-radiation sheet, a heat-radiation grease, or the like, is interleaved between the outer peripheral surface of each of metal substrates 17, 18 and the inner peripheral surface of ECU housing 11B. The reason for forming each of metal substrates 17, 18 thicker will be hereinafter described in detail with reference to FIG. 9.

Figure 4:
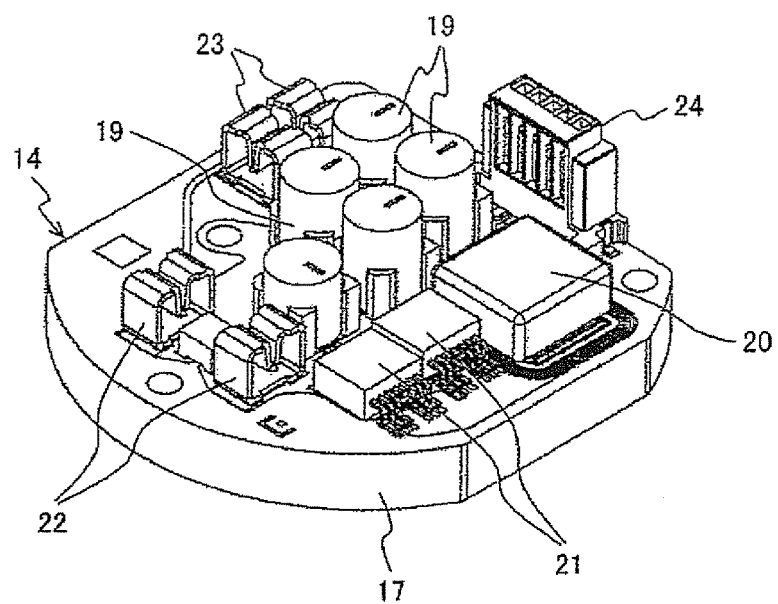
FIG. 4 is a perspective view of a power-supply circuit unit shown in FIG. 3.

Power-supply circuit unit 14 having a main function that generates a high-voltage direct-current power supply used for an inverter device for driving the electric motor and that generates a low-voltage direct-current power supply used for a control circuit such as a microcomputer or the like, is located inside of the lid body 12. As shown in FIG. 4, mounted on one side of the metal substrate 17 made of a metal material having a high thermal conductivity such as aluminum or the like, are electrical components such as condensers 19, a coil 20, a switching element 21 including MOSFETs (metal oxide semiconductor FETs), a power-supply side connector 22 to which a power-supply side connector terminal from a battery is connected, a high-voltage side connector 23 to which a high-voltage side connector terminal for supplying a high-voltage power supply to the power-conversion circuit unit 15 is connected, and a low-voltage side connector 24 to which a low-voltage side connector terminal for supplying a low-voltage power supply to the control circuit unit 16 is connected. Metal substrate 17 is configured by forming an insulating layer on an aluminum substrate and by printing a wiring pattern using a copper foil on the insulating layer. Electrical components are mounted on the printed wiring pattern and electrically connected.

Regarding the power-supply circuit unit 14, electrical components, each of which is comparatively large (tall) in shape (in size), such as condensers 19, coil 20, connectors 22-24 and the like, are used. By the way, connectors 22, 23 are press-fit (snap-fit) type connectors, having resiliencies that snap and bias respective connector terminals back to the insides of connectors 22, 23. Thus, the mere insertion of the connector terminal into the associated connector ensures easy connection between them.

Power-conversion circuit unit 15, which has a main function that drives the electric motor and performs inverter control therefor, is located in the ECU housing 11B. Regarding the power-conversion circuit unit 15, the metal substrate 18 of power-conversion circuit unit 15 is arranged to be opposed to the metal substrate 17 of power-supply circuit unit 14. That is, as can be seen from the drawings, the metal substrate 18 of power-conversion circuit unit 15 is arranged to be opposed to and kept in contact with the metal substrate 17 of power-supply circuit unit 14.

The two opposed faces (i.e., two contact surfaces) of the metal substrate 18 of power-conversion circuit unit 15 and the metal substrate 17 of power-supply circuit unit 14 have a substantially same shape, thereby facilitating thermal conduction between them. Furthermore, a heat-radiation functional material having a high thermal conductivity, such as a thermally conductive adhesive, a heat-radiation sheet, a heat-radiation grease, or the like, is interleaved between them.

Figure 5:
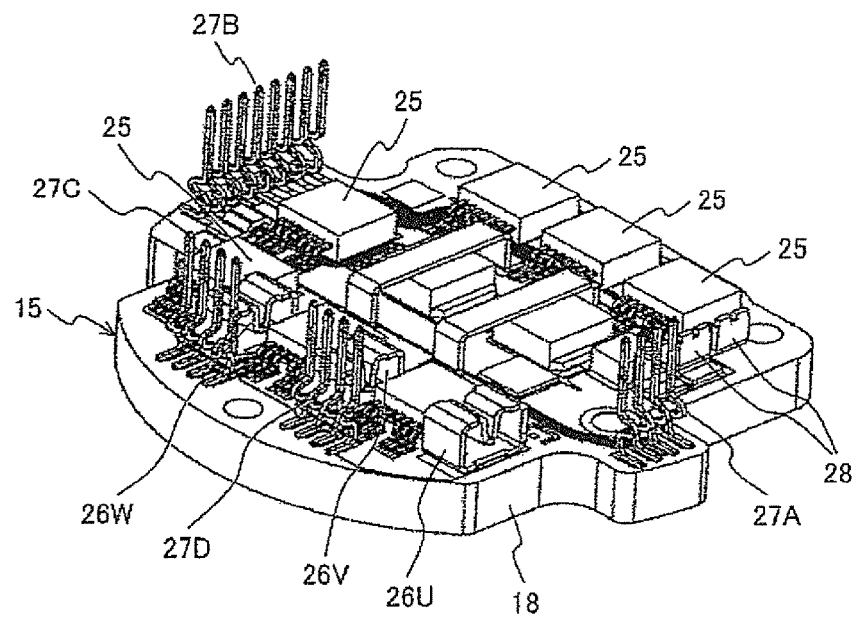
FIG. 5 is a perspective view of a power-conversion circuit unit shown in FIG. 3.

Regarding the power-conversion circuit unit 15, as shown in FIG. 5, mounted on the metal substrate 18 made of a metal material having a high thermal conductivity such as aluminum or the like, are a power switching element 25 including a plurality of MOSFETs (metal oxide semiconductor FETs) or an IGBT (an insulated gate bipolar transistor), output connectors 26U, 26V, 26W for outputs from the power switching element, and connector terminals 27A-27D and the like for signal inputs from a gate, a drain, a source and for feeding an operating state of the switching element 25 back to the control circuit unit 16. Also provided is an inverter-side connector 28 for receiving electric-power supply from the power-supply circuit unit 14. In the shown embodiment, in addition to six switching elements 25, three fail-safe switching elements 25 are further provided.

By the way, output connectors 26U, 26V, 26W are press-fit (snap-fit) type connectors, having resiliencies that snap and bias respective connector terminals of a bus bar connected to the electric motor back to the insides of output connectors 26U, 26V, 26W. Thus, the mere insertion of the bus-bar connector terminal into the associated output connector ensures easy connection between them.

Metal substrate 18 is configured by forming an insulating layer on an aluminum substrate and by printing a wiring pattern using a copper foil on the insulating layer. Electrical components are mounted on the printed wiring pattern and electrically connected. For good understanding, in FIG. 5, the metal substrate is reversed in a manner so as to highlight the side on which the aforementioned electrical components are mounted. Actually, as shown in FIG. 3, the electrical components are mounted on the underside of the metal substrate.

Control circuit unit 16, which has a main function of executing switching control for the switching element 25 of power-conversion circuit unit 15, is located between the power-conversion circuit unit 15 and the motor housing 11A. ECU housing 11B is formed with four resin-substrate mounting bosses 29 extending toward the motor housing 11A. The resin substrate of control circuit unit 16 is fixed onto the resin-substrate mounting bosses 29 with mounting bolts 30.

Figure 6:
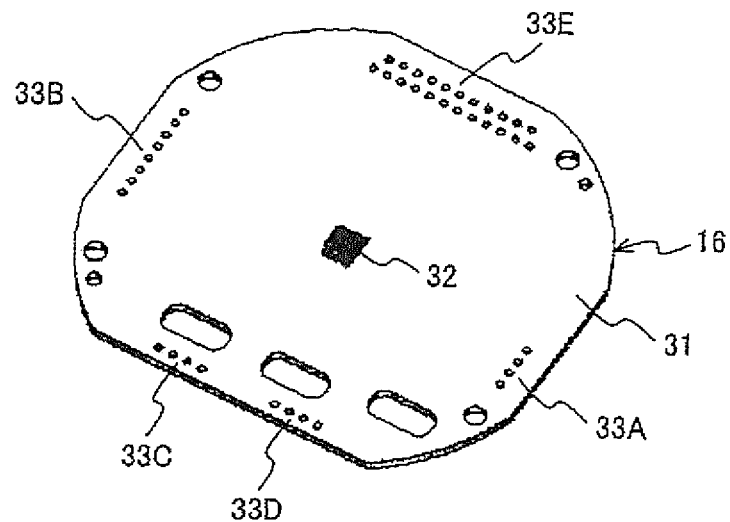
FIG. 6 is a perspective view of a control circuit unit shown in FIG. 3.

Regarding the control circuit unit 16, as shown in FIG. 6, a microcomputer 32, which controls the switching element 25, is mounted on a resin substrate 31 made of synthetic resin. Also, other electrical components such as peripheral circuits of microcomputer 32 are mounted on the resin substrate 31, but these other electrical components are omitted in FIG. 6.

The resin substrate 31 is arranged to be spaced apart from the power-conversion circuit unit 15 by a predetermined distance. Electrical components that construct the power-conversion circuit unit 15 are located in the space defined by the predetermined distance. Control circuit unit 16 and power-conversion circuit unit 15 are connected to each other by connector terminals 27A-27D.

Each of connector terminals 27A-27D has a length longer than the predetermined distance between the resin substrate 31 and the power-conversion circuit unit 15. Connector terminal 27A is connected to a connection hole 33A of resin substrate 31, connector terminal 27B is connected to a connection hole 33B, connector terminal 27C is connected to a connection hole 33C, and connector terminal 27D is connected to a connection hole 33D. Also connected with a connection hole 33E, which is formed in the control substrate (resin substrate 31), is a control-side connector terminal for signal-transmission and for low-voltage power supply. The control-side connector terminal is embedded in an insulating region part (described later) of the lid body 12.

In this manner, the power-supply circuit unit 14, the power-conversion circuit unit 15, and the control circuit unit 16 are arranged from the lid body 12 toward the motor housing 11A in that order. As discussed above, the control circuit unit 16 is arranged in a manner so as to be spaced apart from the power-supply circuit unit 14, and hence it is possible to supply a stable electric power after having eliminated power source noise to the control circuit unit 16.

Returning to FIG. 3, the lid body 12, in which the connector wiring part has been embedded, is configured to cover the opening of ECU housing 11B. In a similar manner to the lid body shown in FIG. 2, lid body 12 of FIG. 3 is equipped on its outside surface in the axial direction with a power-supply connector terminal formation part 12A, a detection-sensor connector terminal formation part 12B, and a control-state-transmission connector terminal formation part 12C for transmitting or sending out a control state to an external apparatus. In lieu thereof, the connector terminal formation part 12B and the connector terminal formation part 12C may be integrally formed as a single connector terminal formation part. Electric power is supplied from a power source (not shown) through these connector terminal formation parts 12A-12C to the power-supply circuit unit 14. Also, signals from detection sensors are inputted to the control circuit unit 16.

Figure 7:
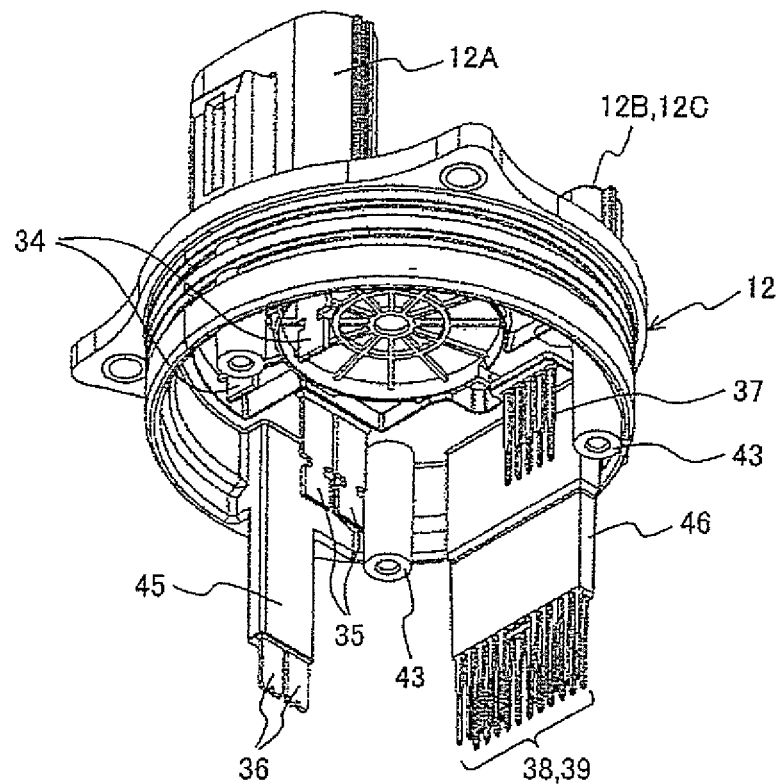
FIG. 7 is a perspective view of a lid body equipped with connector terminals shown in FIG. 3, as viewed at a low oblique angle.

Referring to FIG. 7, there is shown the concrete configuration of lid body 12. In FIG. 7, lid body 12, which also serves as the connector terminal assembly, is equipped inside thereof with various connector wiring parts and their connector terminals.

First, a power-source-connector wiring part serving as a power-supply-connector wiring part, through which the connector terminal formation part 12A connected to an external power source (i.e., an on-vehicle battery) and the power-supply circuit unit 14 are connected with each other, is embedded in the lid body 12, such that a power-source side connector terminal 34, located at the top end of the power-supply-connector wiring part, is exposed from the lid body 12. The power-source side connector terminal 34 is positioned inside of the side peripheral surface of lid body 12 (by the way, the side peripheral surface corresponding to a surface forming a sealed region (described later) together with the ECU housing). The power-source side connector terminal 34 is connected to the power-supply side connector 22 of power-supply circuit unit 14. As discussed previously, the mere insertion of the power-source side connector terminal 34 into the press-fit type power-supply side connector 22 ensures or completes easy connection between them. The power-source-connector wiring part is clearly shown in FIG. 11.

Secondly, a high-voltage side connector wiring part serving as a power-supply-connector wiring part, through which the power-supply circuit unit 14 and the power-conversion circuit unit 15 are connected with each other, is embedded in the lid body 12. Both ends of the high-voltage side connector wiring part are formed as a high-voltage side connector terminal 35 and an inverter-side connector terminal 36, such that these connector terminals are exposed from the lid body 12. One connector terminal, that is, the high-voltage side connector terminal 35 is connected to the high-voltage side connector 23 of power-supply circuit unit 14, while the other connector terminal, that is, the inverter-side connector terminal 36 is connected to the inverter-side connector 28 of power-conversion circuit unit 15. The high-voltage side connector wiring part is clearly shown in FIG. 10.

The high-voltage side connector terminal 35 is connected to the high-voltage side connector 23 of power-supply circuit unit 14. As discussed previously, the mere insertion of the high-voltage side connector terminal 35 into the press-fit type high-voltage side connector 23 completes easy connection between them. Also, the inverter-side connector terminal 36 is connected to the inverter-side connector 28 of power-conversion circuit unit 15. TIG welding (tungsten inert-gas arc welding) the inverter-side connector terminal 36 and the inverter-side connector 28 together completes easy connection between them.

The cross-section of the high-voltage side connector wiring part between the high-voltage side connector terminal 35 and the inverter-side connector terminal 36 is formed into a C shape in which a connector wiring portion corresponding to the inverter-side connector terminal 36 is relatively longer than that of the high-voltage side connector terminal. The relatively longer connector wiring portion is embedded in the synthetic resin that forms the lid body 12, so as to form or provide a high-voltage side insulating region part 45. As clearly shown in FIG. 10, the high-voltage side insulating region part 45 is configured to extend through an insertion part formed on an end face of the outer peripheral side of each of metal substrates 17, 18 to the power-conversion circuit unit 15. The insertion part may be formed as a cut-out cut on the outer peripheral side of each of metal substrates 17, 18. In lieu thereof, the insertion part may be formed as an insertion through hole. Furthermore, the high-voltage side insulting region part 45, which constructs the high-voltage side connector wiring part, is located between the outer peripheral side of each of metal substrates 17, 18 and the inside of the side peripheral surface of the connector lid body 12. The detailed arrangement of the high-voltage side insulting region part will be described later with reference to FIG. 10.

Thirdly, a low-voltage side connector wiring part serving as a power-supply-connector wiring part, through which the power-supply circuit unit 14 and the control circuit unit 16 are connected with each other, is embedded in the lid body 12. Both ends of the low-voltage side connector wiring part are formed as a low-voltage side connector terminal 37 and a control-side connector terminal 38, such that these connector terminals are exposed from the lid body 12. One connector terminal, that is, the low-voltage side connector terminal 37 is connected to the low-voltage side connector 24 of power-supply circuit unit 14, while the other connector terminal, that is, the control-side connector terminal 38 is connected to the connection hole 33E of control circuit unit 16.

Also, a signal-transmission-connector wiring part, which is located adjacent to the low-voltage side connector wiring part and connected to both the detection-sensor connector terminal formation part 12B and the control-state-transmission connector terminal formation part 12C for transmitting signals, is embedded in the lid body 12, such that a control-side connector terminal 39 is exposed from the lid body 12. The low-voltage side connector wiring part is clearly shown in FIG. 11.

The low-voltage side connector terminal 37 is connected to the low-voltage side connector 24 of power-supply circuit unit 14. The mere engagement of the low-voltage side connector terminal 37 with the socket type low-voltage side connector 24 completes easy connection between them. Also, the control-side connector terminal 38 and the signal-transmission control-side connector terminal 39 are connected to the connection hole 33E of control circuit unit 16. Soldering the control-side connector terminals 38, 39 and the connection hole 33E together completes easy connection between them.

The above-mentioned low-voltage side connector wiring part and the signal-transmission connector wiring part are both embedded in the synthetic resin that forms the lid body 12, so as to form or provide a low-voltage side insulating region part 46. As clearly shown in FIG. 11, the low-voltage side insulating region part 46 is configured to extend through an insertion part formed on an end face of the outer peripheral side of each of metal substrates 17, 18 to the control circuit unit 16. The insertion part may be formed as a cut-out cut on the outer peripheral side of each of metal substrates 17, 18. In lieu thereof, the insertion part may be formed as an insertion through hole. Furthermore, the low-voltage side insulting region part 46, which constructs the low-voltage side connector wiring part, is located between the outer peripheral side of each of metal substrates 17, 18 and the inside of the side peripheral surface of the connector lid body 12. The detailed arrangement of the low-voltage side insulting region part will be described later with reference to FIG. 11.

As can be appreciated from FIG. 7, lid body 12 is formed on its inner peripheral surface with metal-substrate mounting bosses 43 for fixing the metal substrate 17 of power-supply circuit unit 14 and the metal substrate 18 of power-conversion circuit unit 15 together. Furthermore, the power-source side connector terminal 34, the high-voltage side connector terminal 35, the inverter-side connector terminal 36, the low-voltage side connector terminal 37, the control-side connector terminal 38, and the signal-transmission control-side connector terminal 39 are arranged close to the inner peripheral surface of lid body 12.

That is, the power-source side connector terminal 34, the high-voltage side connector terminal 35, the inverter-side connector terminal 36, the low-voltage side connector terminal 37, the control-side connector terminal 38, and the signal-transmission control-side connector terminal 39 are arranged in a manner so as to be positioned near the respective outer peripheral sides of the substrates of power-supply circuit unit 14, power-conversion circuit unit 15, and control circuit unit 16.

Hereby, electrical components, which construct the power-supply circuit unit 14, the power-conversion circuit unit 15, and the control circuit unit 16, can be arranged near the center of each of the substrates. Hence, it is possible to reduce the size in the radial direction.

Assuming that some of the above-mentioned terminals pass through inside of the respective substrates, insertion parts therefor have to be formed in the respective metal substrates 17, 18. This means that a heat-radiation passage cross-sectional area of metal substrates 17, 18 becomes narrow. Thus, there is a possibility of deteriorated heat dissipation.

In contrast, in the shown embodiment, the connector wiring parts containing the respective connector terminals are arranged in a manner so as to be positioned outside of the metal substrates 17, 18. This eliminates the necessity of forming useless insertion parts inside of the metal substrates 17, 18, thereby ensuring a sufficient heat-radiation passage cross-sectional area.

In the lid body 12 of the embodiment, the connector wiring part for supplying electric power from the power-supply circuit unit 14 to both the power-conversion circuit unit 15 and the control circuit unit 16, and the connector wiring part for transmitting signals to be input to or output from the control circuit unit are embedded in the connector terminal assembly made of synthetic resin by insert molding. Additionally, connector terminals of the power-supply-connector wiring part and the signal-transmission-connector wiring part, which are exposed from the connector terminal assembly, are directly connected to corresponding connectors of the power-supply circuit unit, the power-conversion circuit unit, and the control circuit unit.

For the reasons discussed above, wirings between the power-conversion circuit unit 15 and the control circuit unit 16 can be eliminated, and hence the respective connector wiring parts can be directly connected to corresponding connectors without using any extra relay connector components. Accordingly, extra relay connector components are unnecessary, and thus reduced number of components contributes to downsizing. Furthermore, the simplified connector-wiring-part configuration suppresses an increase in assembly man-hour, and consequently suppresses a rise in unit price of product.

Also, in the shown embodiment, the connector wiring parts containing the respective connector terminals are arranged in a manner so as to be positioned outside of the resin substrate 31 as well as the metal substrates 17, 18. This eliminates the necessity of forming useless insertion parts inside of the metal substrates 17, 18, thereby ensuring a sufficient heat-radiation passage cross-sectional area.

The assembling order of the electric power steering device shown in FIG. 3 is as follows. First, the metal substrate 17 of power-supply circuit unit 14 and the metal substrate 18 of power-conversion circuit unit 15 are opposed to each other, and then fixing bolts 44 are inserted. After this, the fixing bolts 44 are screwed into the respective metal-substrate mounting bosses 43 formed in the lid body 12, for fastening the power-supply circuit unit 14, the power-conversion circuit unit 15, and the lid body 12, together with the fixing bolts.

In this state, connection between the power-supply side connector 22 of power-supply circuit unit 14 and the power-source side connector terminal 34 is completed, while connection between the high-voltage side connector 23 of the high-voltage side connector wiring part and the high-voltage side connector terminal 35 is completed. Furthermore, connection between the low-voltage side connector 24 and the low-voltage side connector terminal 37 is completed.

Next, in the above-mentioned state, the high-voltage side insulating region part 45 has protruded from the power-conversion circuit unit 15, and hence the inverter-side connector terminal 36, which is exposed from the insulting region part, and the inverter-side connector 28 are connected together by the use of a TIG-welding torch.

Subsequently to the above, ECU housing 11B is inserted toward the lid body 12, and then the ECU housing and the lid body are fixedly fastened together with the fixing bolts 13. After this, the fixing bolts 30 are screwed into the respective resin-substrate mounting bosses 29 for fastening and mounting the control circuit unit 16 on the resin-substrate mounting bosses. In this manner, the control circuit unit 16 and the ECU housing 11B are united together.

Under the above-mentioned state, the connection holes 33A-33E, which are formed in the resin substrate 31 of control circuit unit 16, and the corresponding connector terminals 27A-27D and connector terminals 38, 39 are connected together by soldering. In this manner, electronic control unit part 9 can be completed.

Thereafter, electronic control unit part 9 is fixedly connected onto the motor housing 11A with fixing bolts, utilizing a mounting flange formed integral with the ECU housing 11B. In this manner, the motor housing 11A and the ECU housing 11B are united together.

Details of the configuration of the electronic control assembly, which is housed in the ECU housing 11B, are hereunder described with reference to FIGS. 8-11.

Figure 8:
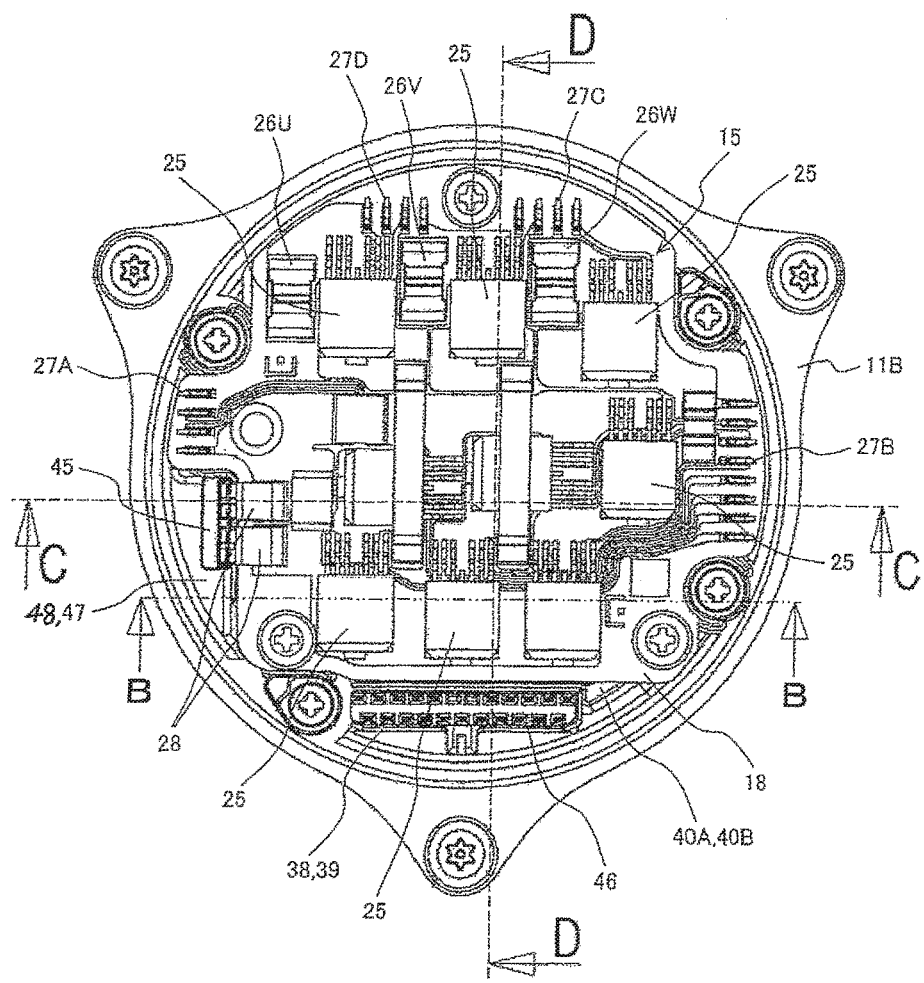
FIG. 8 is a plan view illustrating the lid body viewed from the direction of the plane A-A shown in FIG. 3.

Referring to FIG. 8, there is shown the plan view illustrating the lid body 12 viewed from the direction of the plane A-A shown in FIG. 3, and also illustrating the planar structure of the power-conversion circuit unit 15. However, the detailed configuration/structure of power-conversion circuit unit 15 itself has already been explained with reference to FIG. 5. Thus, the detailed description of the power-conversion circuit unit will be omitted because the above description thereon seems to be self-explanatory. An important point related to the electronic control assembly is that insertion parts 40A, 48 are formed on respective end faces of the outer peripheral side of metal substrate 18.

Figure 11:
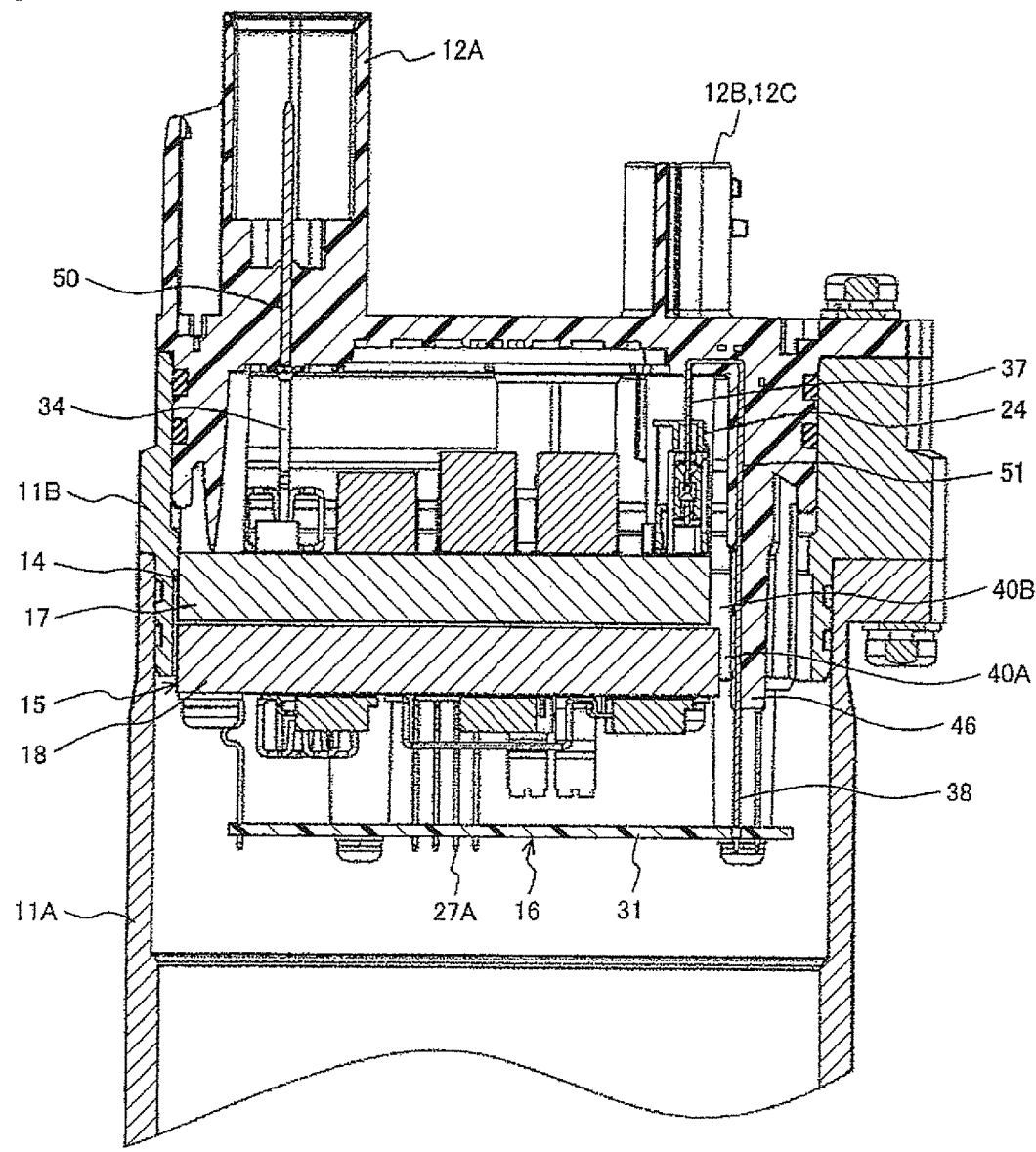
FIG. 11 is a sectional view illustrating a cross section of the electric power steering device taken along the plane D-D of FIG. 8, but the electric motor part is omitted.

The insertion part 40A is a linear cut-out cut in the outer periphery of metal substrate 18. The previously-discussed low-voltage side insulting region part 46 is configured to extend through the insertion part 40A to the control circuit unit 16. The reason for the insertion part 40A formed as a linear "cut-out" is that there are a large number of wiring parts passing through the low-voltage side insulting region part 46, and thus the increased "cut-out" area permits these wiring parts to be inserted through the low-voltage side insulting region part 46. As a matter of course, as shown in FIG. 11, an insertion part 40B is also formed in the outer periphery of metal substrate 17 in a manner so as to be substantially conformable to the insertion part 40A formed in the metal substrate 18.

In a similar manner to the above, the insertion part 48 is a cut-out cut in the outer periphery of metal substrate 18. The previously-discussed high-voltage side insulting region part 45 is configured to extend through the insertion part 48 to the power-conversion circuit unit 15. As a matter of course, an insertion part is also formed in the outer periphery of metal substrate 17 in a manner so as to be substantially conformable to the insertion part 48 formed in the metal substrate 18.

The cross section of the electric power steering device taken along the plane B-B of FIG. 8 is hereunder described with reference to FIG. 9, but the electric motor part is omitted in FIG. 9.

Figure 9:
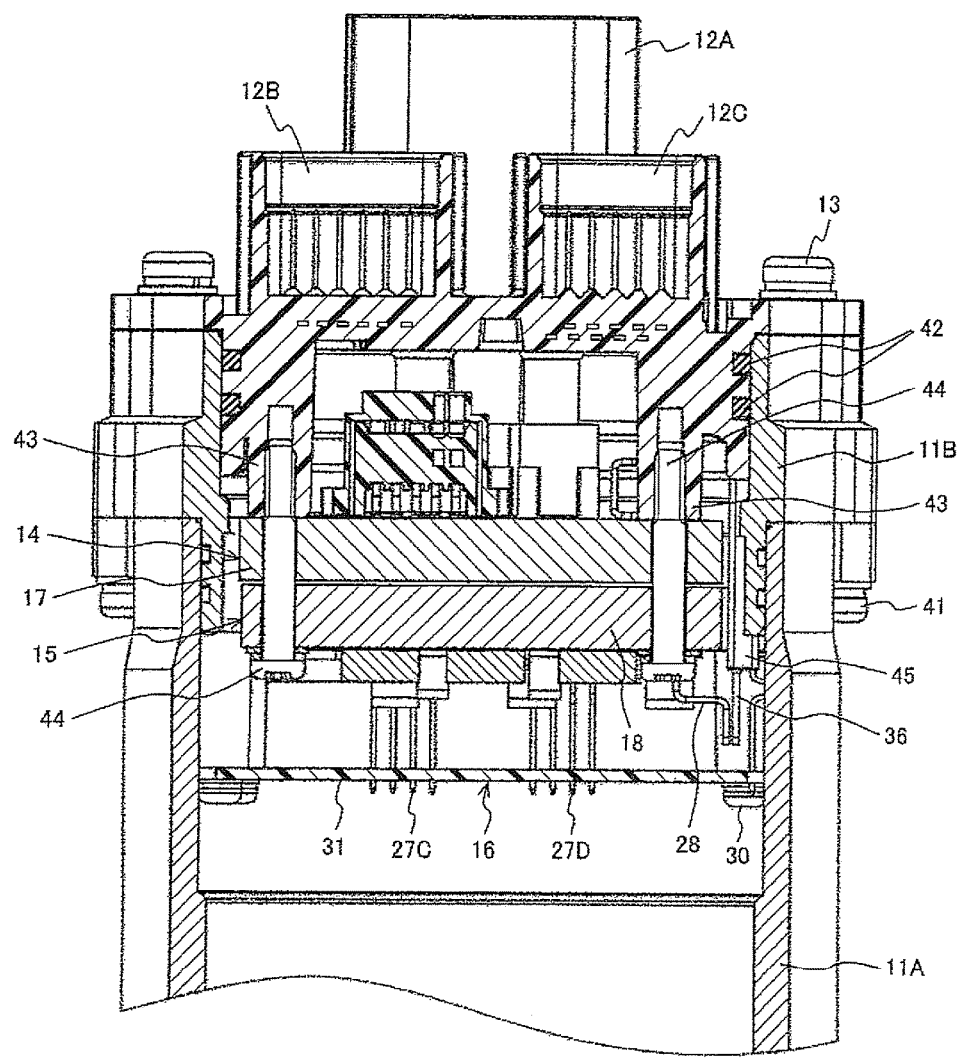
FIG. 9 is a sectional view illustrating a cross section of the electric power steering device taken along the plane B-B of FIG. 8, but an electric motor part is omitted.

In FIG. 9, the ECU housing 11B and the motor housing 11A are fixedly connected to each other with a plurality of fixing bolts 41 screwed into the mounting flanges formed integral with the respective housings. In a similar manner, the ECU housing 11B and the lid body 12 are fixedly connected to each other with the plurality of fixing bolts 13 screwed into the mounting flanges formed integral with the ECU housing and the lid body, respectively.

Part of the lid body 12 except the connector terminal formation parts 12A-12C is housed in the opening of the ECU housing 11B. The outer peripheral surface of the lid body 12 is kept in close-contact with the inner peripheral surface of ECU housing 11B. Seal rings 42 are located in the outer peripheral surface of lid body 12. Undesirable entry of water or the like into the clearance between the lid body 12 and the ECU housing 11B can be prevented by means of the seal rings 42.

Lid body 12 is formed on its inner periphery with metal-substrate mounting bosses 43 for fixing the metal substrate 17 of power-supply circuit unit 14 and the metal substrate 18 of power-conversion circuit unit 15 together. Such metal-substrate mounting bosses 43 are generally formed at four points, but, as seen in FIG. 3, in the embodiment only one place is omitted and thus the metal-substrate mounting bosses 43 are formed at only three points. The reason for this is to reduce the area of metal substrate 18 of power-conversion circuit unit 15 as much as possible and to reduce the number of fixing bolts.

Each of the metal substrate 17 of power-supply circuit unit 14 and the metal substrate 18 of power-conversion circuit unit 15 is formed with insertion holes through which fixing bolts 44 are inserted. With the simplified structure, the metal substrate 17 of power-supply circuit unit 14 and the metal substrate 18 of power-conversion circuit unit 15 are strongly fixed onto the metal-substrate mounting bosses 43 by screwing the fixing bolts 44 from the side of metal substrate 18 of power-conversion circuit unit 15 into the respective metal-substrate mounting bosses 43. Furthermore, the metal substrate 17 of power-supply circuit unit 14 and the metal substrate 18 of power-conversion circuit unit 15 are arranged to be opposed to each other, thereby enabling heat transfer between them.

As previously described with reference to FIG. 3, metal substrates 17, 18 have a heat-radiation function that emits or radiates heat from both the power-supply circuit unit 14 and the power-conversion circuit unit 15 to the ECU housing 11B. Hence, the inner peripheral side of ECU housing 11B and the outer peripheral side of each of metal substrates 17, 18 are structured to be kept in thermal-contact with each other. Additionally, to improve the thermal contact performance, a heat-radiation functional material having a high thermal conductivity, such as a thermally conductive adhesive, a heat-radiation sheet, a heat-radiation grease, or the like, is interleaved between the outer peripheral surface of each of metal substrates 17, 18 and the inner peripheral surface of ECU housing 11B.

Hereupon, in the shown embodiment metal substrates 17, 18 are both formed thicker, for the purpose of enhancing their radiating abilities. Usually, a thin metal substrate made of aluminum alloy is used as metal substrates 17, 18. However, in the case of the use of such a thin metal substrate, a heat-radiation passage cross-sectional area is insufficient and thus a phenomenon that heat is accumulated in the thin metal substrate tends to occur. Thus, there is a possibility for the accumulated heat to exert a bad influence upon the electrical components of power-supply circuit unit 14 and power-conversion circuit unit 15.

One way of improving the heat-dissipation performance of the previously-noted thin metal substrate is to fix the thin metal substrate onto a heat-radiation substrate prepared separately. However, this leads to the task of increasing manufacturing costs owing to the heat-radiation substrate die-formed by die-casting and also leads to the task of increasing the number of fixing bolts used for fixing the metal substrate onto the heat-radiation substrate (with the proviso that the device of the invention can be applied to a structure in which a heat-radiation substrate together with the metal substrate has been used or prepared separately).

In contrast to the above, in the shown embodiment, the thickness of metal substrate 17 and the thickness of metal substrate 18 are formed thicker. Also, these metal substrates are thermally connected to each other via a heat-radiation functional material interleaved between them. As a result of this, metal substrate 17 and metal substrate 18 can be treated or used just like a single thick heat-radiation substrate. Therefore, by virtue of both of metal substrate 17 and metal substrate 18, a sufficient heat-radiation passage can be ensured, thereby enabling sufficient heat dissipation from the electrical components of power-supply circuit unit 14 and power-conversion circuit unit 15.

In the shown embodiment, each of the metal substrates is structured to have a two times or more thickness than a conventional thin metal substrate. Generally, the thickness of a conventional thin metal substrate is approximately 2 millimeters. In the shown embodiment, the thickness of each of the metal substrates is set to be a thickness ranging from 4 millimeters to 10 millimeters. By the way, heat of each of metal substrates 17, 18 is transferred to the ECU housing 11B, and then released from the outer peripheral surface of ECU housing 11B to the atmosphere.

By fastening the metal substrate 17 of power-supply circuit unit 14 and the metal substrate 18 of power-conversion circuit unit 15 together with fixing bolts 44, the heat-radiation passage of power-supply circuit unit 14 and power-conversion circuit unit 15 can be enlarged as if a united heat-radiation substrate has been provided or used. Furthermore, the number of fixing bolts can be reduced, thus enabling reduced unit price of product.

As previously stated, the use of a heat-radiation substrate requires a die-formed heat-radiation substrate formed by die-casting, increases the number of fixing bolts for fixedly connecting each of the metal substrates and the heat-radiation substrate, and further increases the number of component parts owing to a heat-radiation functional material such as a heat-radiation grease or the like, needed on both faces of the heat-radiation substrate.

In contrast, the device of the embodiment merely requires that each of metal substrates 17, 18 should be formed thicker. This eliminates the necessity of manufacturing a die-formed heat-radiation substrate by die-casting. Thus it is possible to keep down the unit price of product. Also, this means reduced number of fixing bolts needed for fixing metal substrates 17, 18 onto respective heat-radiation substrates and reduced installation places of heat-radiation functional materials. As a result, it is possible to reduce the number of component parts and reduced assembly man-hour, thus suppressing a rise in total unit price of product.

Electrical components, such as condensers, a coil and the like, which construct the power-supply circuit unit 14 and have a large shape dimension, are housed between the metal substrate 17 of power-supply circuit unit 14 and the bottom face of the inside of lid body 12. These electrical components, each of which has a large shape dimension, require a large housing space. Therefore, the device of the embodiment utilizes a long sealed region defined between the outer peripheral surface of lid body 12 and the inner peripheral surface of ECU housing 11B, so as to form the above-mentioned large housing space.

That is to say, the electric power steering device is located in the engine room of an automotive vehicle, and thus a situation where the electric power steering device is wetted with rainwater during driving in rainy weather or water in the puddle during driving on the road containing puddles, often occurs. For this reason, a sufficient water-tightness in the contact region of the ECU housing 11B and the lid body 12 has to be ensured. Hence, the sealed region between both the ECU housing and the lid body is lengthened and additionally two seal rings 42 are installed in the sealed region.

In this manner, seal rings 42 are installed double, and thus a more reliable water-tightness can be ensured. Additionally, by virtue of the long sealed region, a large housing space can be formed between the lid body 12 and the metal substrate of power-supply circuit unit 14. The power-supply circuit unit 14, which is constructed by electrical components, each having a large shape dimension, can be easily housed in the large housing space. As discussed above, by virtue of an effective utilization of the space defined for ensuring a more reliable water-tightness, the power-supply circuit unit 14, which is constructed by electrical components, each having a large shape dimension, can be effectively housed.

Hereby, it is possible to shorten the axial length as much as possible. Also, the power-source side connector terminal 34, which is connected to the power source, and the press-fit (snap-fit) type power-supply side connector 22 of power-supply circuit unit 14 are arranged to be opposed to each other, and configured such that the power-source side connector terminal is directly inserted into and connected to the press-fit type power-supply side connector. This facilitates the assembly work.

The cross section of the electric power steering device taken along the plane C-C of FIG. 8 is hereunder described with reference to FIG. 10, but the electric motor part is omitted in FIG. 10.

Figure 10:
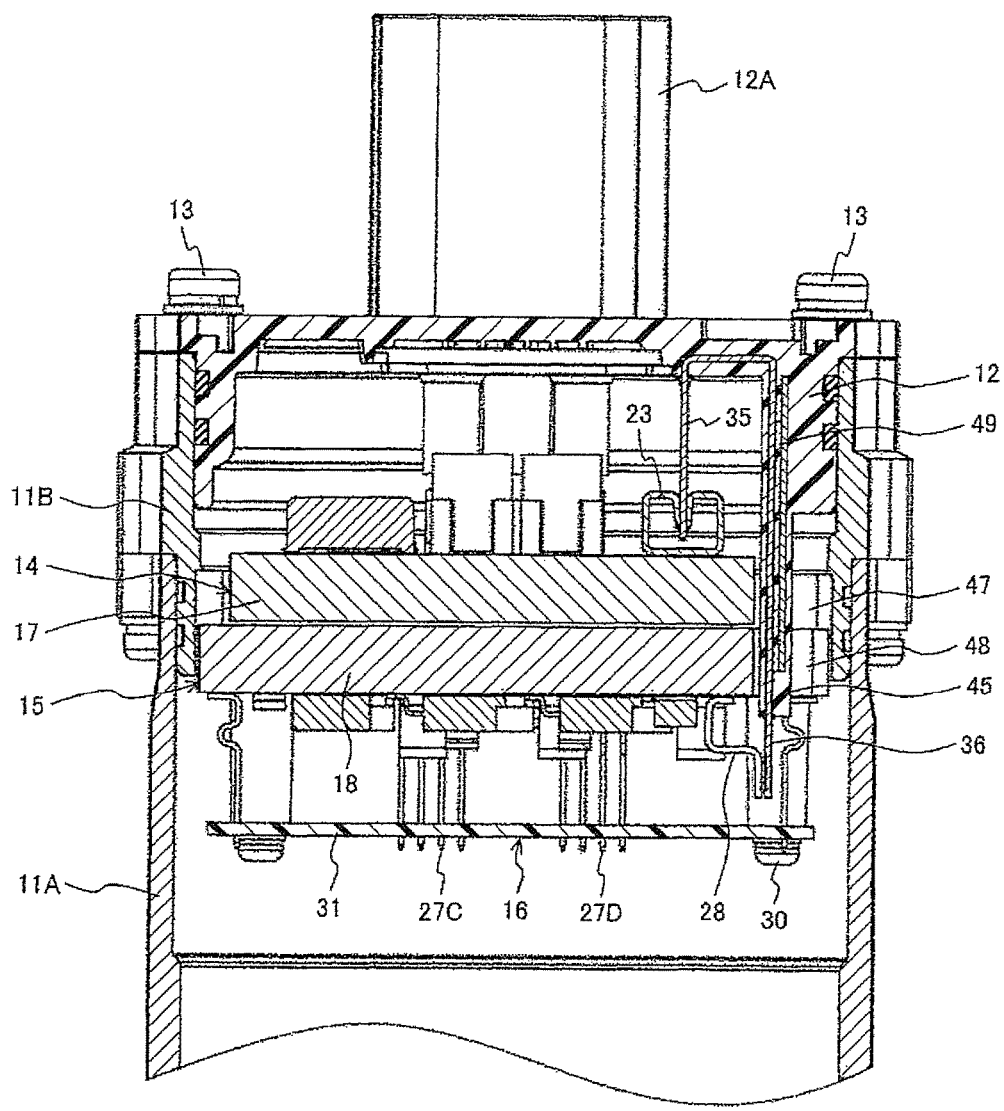
FIG. 10 is a sectional view illustrating a cross section of the electric power steering device taken along the plane C-C of FIG. 8, but the electric motor part is omitted.

In FIG. 10, the high-voltage side insulating region part 45 made of synthetic resin extends from the bottom face of the inside of lid body 12 toward the control circuit unit 16. The high-voltage side insulating region part 45 is configured to extend through the insertion part 47 provided on the outer peripheral side of metal substrate 17 and the insertion part 48 provided on the outer peripheral side of metal substrate 18 to the power-conversion circuit unit 15. By the way, the insertion part 47 of metal substrate 17 and the insertion part 48 of metal substrate 18 are formed between the outer peripheral surfaces of metal substrates 17, 18 and the side peripheral surface of lid body 12.

A high-voltage side connector wiring part 49 is embedded in the high-voltage side insulating region part 45. One end of the high-voltage side connector wiring part 49 is formed as the high-voltage side connector terminal 35, whereas the other end of the high-voltage side connector wiring part 49 is formed as the inverter-side connector terminal 36. In this manner, the provision of high-voltage side insulating region part 45 ensures electrical insulation between the high-voltage side connector wiring part 49 and each of metal substrate 17, 18.

The high-voltage side connector wiring part 49 including the high-voltage side connector terminal 35 and the inverter-side connector terminal 36 is formed into a C shape. The high-voltage side connector 23 of power-supply circuit unit 14 and the inverter-side connector 28 of power-conversion circuit unit 15 are arranged reversely from each other, and thus these connecting pairs can be reciprocally connected.

Therefore, when fixing the lid body 12 onto the ECU housing 11B, connection between the high-voltage side connector terminal 35 and the press-fit type high-voltage side connector 23 can be completed by inserting the high-voltage side connector terminal into the press-fit type high-voltage side connector. Also, connection between the inverter-side connector terminal 36 and the inverter-side connector 28 can be completed by TIG-welding the inverter-side connector terminal to the inverter-side connector. At this time, the control circuit unit 16 is not yet installed, and hence the TIG-welding torch can be easily brought close to the inverter-side connector terminal 36 as well as the inverter-side connector 28.

The high-voltage side insulating region part 45, which constructs the high-voltage side connector wiring part, is arranged in a manner so as to be positioned outside of the metal substrates 17, 18 and the resin substrate 31. Hence, there are not any useless insertion parts formed inside of the metal substrates 17, 18, thereby ensuring a sufficient heat-radiation passage cross-sectional area.

The cross section of the electric power steering device taken along the plane D-D of FIG. 8 is hereunder described with reference to FIG. 11, but the electric motor part is omitted in FIG. 11.

In FIG. 11, a power-supply-connector wiring part 50, which connects the external power source and the power-supply circuit unit 14, is embedded in the connector terminal formation part 12A. The power-source side connector terminal 34, located at the top end of the power-supply-connector wiring part 50, is exposed from the lid body 12. The power-source side connector terminal 34 is connected to the power-supply side connector 22 of power-supply circuit unit 14. The mere insertion of the power-source side connector terminal 34 into the press-fit type power-supply side connector 22 ensures or completes easy connection between them.

Also, the low-voltage side insulating region part 46 made of synthetic resin extends from the bottom face of the inside of lid body 12 toward the control circuit unit 16. The low-voltage side insulating region part 46 is configured to extend through the insertion part 40B formed in the metal substrate 17 and the insertion part 40A formed in the metal substrate 18 to the control circuit unit 16. By the way, the insertion part 40B of metal substrate 17 and the insertion part 40A of metal substrate 18 are formed between the outer peripheral surfaces of metal substrates 17, 18 and the side peripheral surface of lid body 12.

A low-voltage side connector wiring part 51 is embedded in the low-voltage side insulating region part 46. One end of the low-voltage side connector wiring part 51 is formed as the low-voltage side connector terminal 37, whereas the other end of the low-voltage side connector wiring part 51 is formed as the control-side connector terminal 38. In this manner, the provision of low-voltage side insulating region part 46 ensures electrical insulation between the low-voltage side connector wiring part 51 and each of metal substrate 17, 18.

The low-voltage side connector wiring part 51 including the low-voltage side connector terminal 37 and the control-side connector terminal 38 is formed into a C shape. The low-voltage side connector 24 of power-supply circuit unit 14 and the connection hole 33E of control circuit unit 16 can be reciprocally connected. Therefore, when fixing the lid body 12, connection between the low-voltage side connector terminal 37 and the press-fit type low-voltage side connector 24 can be completed by inserting the low-voltage side connector terminal into the press-fit type low-voltage side connector. Also, connection between the control-side connector terminal 38 and the connection hole 33E of the resin substrate 31 of control circuit unit 16 can be completed by soldering them together, while inserting the control-side connector terminal into the connection hole. At this time, the resin substrate 31 of control circuit unit 16 has already been fixed onto the resin-substrate mounting bosses 29 with fixing bolts 30. Under this state, the control-side connector terminal 38 and the connection hole 33E can be connected together by soldering.

Lid body 12 is provided with the detection-sensor external connector terminal formation part 12B, and the control-state-transmission external connector terminal formation part 12C. Furthermore, the signal-transmission-connector wiring part (not shown), which transmits signals supplied through these connector terminal formation parts 12B, 12C, is embedded in the lid body 12, and then the signal-transmission control-side connector terminal 39 is exposed from the lid body 12. The signal-transmission-connector wiring part together with the low-voltage side connector wiring part 51 is embedded in the insulating region part 46. The signal-transmission-connector wiring part is connected to the connection hole 33E of control circuit unit 16.

In the shown embodiment, the low-voltage side insulting region part 46, which constructs the low-voltage side connector wiring part, is arranged in a manner so as to be positioned outside of the metal substrates 17, 18 and the resin substrate 31. Hence, there are not any useless insertion parts formed inside of the metal substrates 17, 18, thereby ensuring a sufficient heat-radiation passage cross-sectional area.

Moreover, as can be appreciated from the respective drawings, in the shown embodiment, the resin substrate 31 of control circuit unit 16, the metal substrate 18 of power-conversion circuit unit 15, and the metal substrate 17 of power-supply circuit unit 14 are arranged in that order, when viewed from the motor housing 11A. Hence, heat from the electric motor is shut off by means of the resin substrate 31 having a heat-insulating property higher than the metal substrates 17, 18, thereby reducing heat received by the electronic control unit part from the electric motor.

As discussed above, in the shown embodiment, the electronic control assembly is divided into a power-supply circuit unit 14 having a main function that generates a power supply and mounted on a metal substrate 17, a power-conversion circuit unit 15 having a main function that drives an electric motor and mounted on a metal substrate 18, and a control circuit unit 16 having a main function that controls the power-conversion circuit unit and mounted on a resin substrate 31, and thus it is possible to reduce the number of electrical components mounted on each individual substrate. As a result of this, it is possible to reduce the radial size of each individual substrate.

By the way, owing to the three-divided substrate configuration, the axial length tends to lengthen, but, such a somewhat lengthened axial length is permitted structurally in the electric power steering device. From the viewpoint of a whole product, it is advantageous to reduce the radial size/constitution rather than the lengthened axial length.

The connector wiring part that supplies electric power from the power-supply circuit unit 14 to the power-conversion circuit unit 15 and the control circuit unit 16 and the connector wiring part that transmits signals to be input to or output from the control circuit unit are embedded in the connector terminal assembly made of synthetic resin by insert molding. Additionally, connector terminals of the connector wiring parts, which are exposed from the connector terminal assembly, that is, the connector wiring part for supplying a high-voltage power supply, the connector wiring part for supplying a low-voltage power supply, and the signal-transmission-connector wiring part, are directly connected to corresponding connectors of the power-supply circuit unit, the power-conversion circuit unit, and the control circuit unit.

For the reasons discussed above, wirings between the power-conversion circuit unit 15 and the control circuit unit 16 can be eliminated, and hence the respective connector wiring parts can be directly connected to corresponding connectors without using any extra relay connector components. Accordingly, extra relay connector components are unnecessary, and thus reduced number of components contributes to downsizing. Furthermore, the simplified connector-wiring-part configuration suppresses an increase in assembly man-hour, and consequently suppresses a rise in unit price of product.

Additionally, in the shown embodiment, the thickness of metal substrate 17 and the thickness of metal substrate 18 are formed thicker. Also, these metal substrates are thermally connected to each other via a heat-radiation functional material interleaved between them. As a result of this, metal substrate 17 and metal substrate 18 can be treated or used just like a single thick heat-radiation substrate. Therefore, by virtue of both of metal substrate 17 and metal substrate 18, a sufficient heat-radiation passage can be ensured, thereby enabling sufficient heat dissipation from the electrical components of power-supply circuit unit 14 and power-conversion circuit unit 15.

By fastening the metal substrate 17 of power-supply circuit unit 14 and the metal substrate 18 of power-conversion circuit unit 15 together with fixing bolts 44, the heat-radiation passage of power-supply circuit unit 14 and power-conversion circuit unit 15 can be enlarged as if a united heat-radiation substrate has been provided or used. Furthermore, the number of fixing bolts can be reduced, thus enabling reduced unit price of product. Moreover, the device of the embodiment merely requires that each of metal substrates 17, 18 should be formed thicker. This eliminates the necessity of manufacturing a die-formed heat-radiation substrate by die-casting. Thus it is possible to keep down the unit price of product.

Additionally, the power-supply circuit unit 14 that uses electrical components, each of which has a large shape dimension, is housed in the housing space between the metal substrate 17 and the lid body 12, in which a comparatively long sealed region exists. Hence, by virtue of an effective utilization of the housing space, it is possible to shorten the axial length as much as possible.

Furthermore, the power-source side connector terminal 34, the high-voltage side connector terminal 35, the inverter-side connector terminal 36, the low-voltage side connector terminal 37, the control-side connector terminal 38, and the signal-transmission control-side connector terminal 39 are arranged in a manner so as to be positioned near the respective outer peripheral sides of the substrates of power-supply circuit unit 14, power-conversion circuit unit 15, and control circuit unit 16. Hereby, electrical components, which construct the power-supply circuit unit 14, the power-conversion circuit unit 15, and the control circuit unit 16, can be arranged near the center of each of the substrates. Hence, it is possible to reduce the size in the radial direction. The respective connector terminals are arranged in a manner so as to be positioned outside of the metal substrates 17, 18. This eliminates the necessity of forming useless insertion parts inside of the metal substrates 17, 18, thereby ensuring a sufficient heat-radiation passage.

In the embodiment as discussed previously, the thickness of metal substrate 17 of power-supply circuit unit 14 and the thickness of metal substrate 18 of power-conversion circuit unit 15 are formed thicker. The metal substrates 17, 18, which are stacked on another, serve as a united heat-radiation substrate. In lieu thereof, a conventional thin metal substrate may be used as a heat-radiation substrate. In this case, concretely, in order to dissipate or radiate heat generated from electrical components, which construct the power-supply circuit unit and the power-conversion circuit unit, an aluminum alloy material having a thickness greater than or equal to a predetermined dimension has to be prepared as a heat-radiation substrate, and then the heat-radiation substrate is located inside of the ECU housing and positioned to extend in the radial direction. Furthermore, the metal substrate of the power-supply circuit unit and the metal substrate of the power-conversion circuit unit are connected to both faces of the heat-radiation substrate, respectively, and the heat-radiation substrate is connected to the ECU housing so as to dissipate or radiate heat.

That is, an aluminum alloy material having the summed thickness of the thickness of metal substrate 17 and the thickness of metal substrate 18 (with the proviso that a somewhat deviation of the thickness dimension can be tolerated) is used as a heat-radiation substrate, and then a thin metal substrate of a conventional thickness is connected to this heat-radiation substrate of the summed thickness for the purpose of heat radiation/dissipation. In this case, it is necessary to thermally connect the heat-radiation substrate to the ECU housing 11B. Furthermore, in the same manner as the embodiment, a heat-radiation functional material may be added for the purpose of promoting heat radiation/dissipation.

As discussed above, according to the invention, an electronic control assembly is divided into a power-supply circuit unit having a main function that generates a power supply and mounted on a metal substrate, a power-conversion circuit unit having a main function that drives an electric motor and mounted on a metal substrate, and a control circuit unit having a main function that controls the power-conversion circuit unit and mounted on a resin substrate. Additionally, at least a power-supply-connector wiring part that supplies electric power from the power-supply circuit unit to the power-conversion circuit unit and the control circuit unit and a signal-transmission-connector wiring part that transmits signals to be input to or output from the control circuit unit are embedded in a connector terminal assembly made of synthetic resin. Furthermore, connector terminals of the power-supply-connector wiring part and the signal-transmission-connector wiring part, which are exposed from the connector terminal assembly, are directly connected to corresponding connectors of the power-supply circuit unit, the power-conversion circuit unit, and the control circuit unit.

According to the above, electric components, which construct an electronic control unit, are mounted on three substrates according to respective functions, and thus it is possible to reduce the radial size of each individual substrate. Additionally, connector wiring parts, through which circuit units are electrically connected to each other, are assembled or gathered together on a connector terminal assembly made of synthetic resin and directly connected to the corresponding circuit units, and thus it is possible to reduce the number of components of the connector terminal assembly. As a result of this, the device of the invention can provide an advantageous effect such as simplified configuration.

While the foregoing is a description of the preferred embodiments carried out the invention, it will be understood that the invention is not limited to the particular embodiments shown and described herein, but that various changes and modifications may be made without departing from the scope or spirit of this invention. For instance, for better understanding, the aforementioned embodiments are explained in detail, but all components/elements as explained above do not need to be provided. Furthermore, a part of components/elements of one embodiment may be replaced with a part of another embodiment. Moreover, a component/element of one embodiment may be added to components/elements of another embodiment. Also, regarding each of components/elements of each embodiment, addition, deletion, or replacement may be arbitrarily made.

As an electric driving device and an electric power steering device based on the embodiments shown and explained above, several aspects described below can be taken into account.

That is to say, according to one aspect of the electric driving device, there is provided an electric driving device constructed by an electric motor for driving a mechanical-system control element and an electronic control unit located opposite to an output shaft of the electric motor and configured to control the electric motor, the electronic control unit being equipped with an ECU housing connected to a motor housing in which the electric motor is housed and an electronic control assembly housed in the ECU housing for driving and controlling the electric motor, characterized in that the electronic control assembly is divided into a power-supply circuit unit having a main function that generates a power supply and mounted on a metal substrate, a power-conversion circuit unit having a main function that drives the electric motor and mounted on a metal substrate, and a control circuit unit having a main function that controls the power-conversion circuit unit and mounted on a resin substrate, in that at least a power-supply-connector wiring part that supplies electric power from the power-supply circuit unit to the power-conversion circuit unit and the control circuit unit and a signal-transmission-connector wiring part that transmits signals to be input to or output from the control circuit unit are embedded in a connector terminal assembly made of synthetic resin, and in that connector terminals of the power-supply-connector wiring part and the signal-transmission-connector wiring part, which are exposed from the connector terminal assembly, are directly connected to corresponding connectors of the power-supply circuit unit, the power-conversion circuit unit, and the control circuit unit.

According to a preferable aspect of the electric driving device, the connector terminal assembly serves as a lid body that closes an opening of the ECU housing in which the power-supply circuit unit, the power-conversion circuit unit, and the control circuit unit are housed.

According to another preferable aspect, the power-supply circuit unit, the power-conversion circuit unit, and the control circuit unit are arranged from the lid body in that order, electrical components of the power-supply circuit unit and the power-conversion circuit unit are mounted on a first side of each of the metal substrates by single-sided mounting, and a second side of the metal substrate of the power-supply circuit unit and a second side of the metal substrate of the power-conversion circuit unit are fixed to be opposed to each other and thermally connected to each other, the second side being opposite to the first side of each of the metal substrates.

According to a further preferable aspect, the power-supply-connector wiring part is configured to extend through an insertion part formed at the metal substrate of the power-supply circuit unit and an insertion part formed at the metal substrate of the power-conversion circuit unit to the power-conversion circuit unit, and the signal-transmission-connector wiring part is configured to extend through an insertion part formed at the metal substrate of the power-supply circuit unit and an insertion part formed at the metal substrate of the power-conversion circuit unit to the control circuit unit.

According to a still further preferable aspect, the power-supply-connector wiring part comprises a high-voltage side connector wiring part and a low-voltage side connector wiring part, the high-voltage side connector wiring part is connected through a first insertion part formed at each of the metal substrate of the power-supply circuit unit and the metal substrate of the power-conversion circuit unit to the power-conversion circuit unit, and the low-voltage side connector wiring part is connected through a second insertion part formed at each of the metal substrate of the power-supply circuit unit and the metal substrate of the power-conversion circuit unit to the control circuit unit.

According to another preferable aspect, a portion of the high-voltage side connector wiring part other than terminals of both ends of the high-voltage side connector wiring part is embedded in the synthetic resin that forms the lid body so as to form a high-voltage side insulating region part, the high-voltage side insulating region part is positioned in the respective first insertion parts of the metal substrates, a portion of the low-voltage side connector wiring part other than terminals of both ends of the low-voltage side connector wiring part and a portion of the signal-transmission-connector wiring part other than terminals of both ends of the signal-transmission-connector wiring part are embedded in the synthetic resin that forms the lid body so as to form a low-voltage side insulating region part, and the low-voltage side insulating region part is positioned in the respective second insertion parts of the metal substrates.

According to another preferable aspect, the high-voltage side connector wiring part, the low-voltage side connector wiring part, and the signal-transmission-connector wiring part are arranged on an outer peripheral side of each of the metal substrate of the power-supply circuit unit and the metal substrate of the power-conversion circuit unit.

From another viewpoint of the electric power steering device, there is provided an electric power steering device constructed by an electric motor for applying a steering assist force to a steering shaft and an electronic control unit located opposite to an output shaft of the electric motor and configured to control the electric motor, the electronic control unit being equipped with an ECU housing connected to a motor housing in which the electric motor is housed and an electronic control assembly housed in the ECU housing for driving and controlling the electric motor, characterized in that the electronic control assembly is divided into a power-supply circuit unit having a main function that generates a power supply and mounted on a metal substrate, a power-conversion circuit unit having a main function that drives the electric motor and mounted on a metal substrate, and a control circuit unit having a main function that controls the power-conversion circuit unit and mounted on a resin substrate, in that at least a power-supply-connector wiring part that supplies electric power from the power-supply circuit unit to the power-conversion circuit unit and the control circuit unit and a signal-transmission-connector wiring part that transmits signals to be input to or output from the control circuit unit are embedded in a connector terminal assembly made of synthetic resin, and in that connector terminals of the power-supply-connector wiring part and the signal-transmission-connector wiring part, which are exposed from the connector terminal assembly, are directly connected to corresponding connectors of the power-supply circuit unit, the power-conversion circuit unit, and the control circuit unit.

According to a preferable aspect of the electric power steering device, the connector terminal assembly serves as a lid body that closes an opening of the ECU housing in which the power-supply circuit unit, the power-conversion circuit unit, and the control circuit unit are housed.

According to another preferable aspect, the power-supply circuit unit, the power-conversion circuit unit, and the control circuit unit are arranged from the lid body in that order, electrical components of the power-supply circuit unit and the power-conversion circuit unit are mounted on a first side of each of the metal substrates by single-sided mounting, and a second side of the metal substrate of the power-supply circuit unit and a second side of the metal substrate of the power-conversion circuit unit are fixed to be opposed to each other and thermally connected to each other, the second side being opposite to the first side of each of the metal substrates.

According to a further preferable aspect, the power-supply-connector wiring part is configured to extend through an insertion part formed at the metal substrate of the power-supply circuit unit and an insertion part formed at the metal substrate of the power-conversion circuit unit to the power-conversion circuit unit, and the signal-transmission-connector wiring part is configured to extend through an insertion part formed at the metal substrate of the power-supply circuit unit and an insertion part formed at the metal substrate of the power-conversion circuit unit to the control circuit unit.

According to a still further preferable aspect, the power-supply-connector wiring part comprises a high-voltage side connector wiring part and a low-voltage side connector wiring part, the high-voltage side connector wiring part is connected through a first insertion part formed at each of the metal substrate of the power-supply circuit unit and the metal substrate of the power-conversion circuit unit to the power-conversion circuit unit, and the low-voltage side connector wiring part is connected through a second insertion part formed at each of the metal substrate of the power-supply circuit unit and the metal substrate of the power-conversion circuit unit to the control circuit unit.

According to another preferable aspect, a portion of the high-voltage side connector wiring part other than terminals of both ends of the high-voltage side connector wiring part is embedded in the synthetic resin that forms the lid body so as to form a high-voltage side insulating region part, the high-voltage side insulating region part is positioned in the respective first insertion parts of the metal substrates, a portion of the low-voltage side connector wiring part other than terminals of both ends of the low-voltage side connector wiring part and a portion of the signal-transmission-connector wiring part other than terminals of both ends of the signal-transmission-connector wiring part are embedded in the synthetic resin that forms the lid body so as to form a low-voltage side insulating region part, and the low-voltage side insulating region part is positioned in the respective second insertion parts of the metal substrates.

According to another preferable aspect, the high-voltage side connector wiring part, the low-voltage side connector wiring part, and the signal-transmission-connector wiring part are arranged on an outer peripheral side of each of the metal substrate of the power-supply circuit unit and the metal substrate of the power-conversion circuit unit.

The invention claimed is:

1. An electric driving device constructed by an electric motor for driving a mechanical-system control element and an electronic control unit located opposite to an output shaft of the electric motor and configured to control the electric motor, the electronic control unit being equipped with an ECU housing connected to a motor housing in which the electric motor is housed and an electronic control assembly housed in the ECU housing for driving and controlling the electric motor, wherein the electronic control assembly is divided into a power-supply circuit unit having a main function that generates a power supply and mounted on a metal substrate, a power-conversion circuit unit having a main function that drives the electric motor and mounted on a metal substrate, and a control circuit unit having a main function that controls the power-conversion circuit unit and mounted on a resin substrate, in that at least a power-supply-connector wiring part that supplies electric power from the power-supply circuit unit to the power-conversion circuit unit and the control circuit unit and a signal-transmission-connector wiring part that transmits signals to be input to or output from the control circuit unit are embedded in a connector terminal assembly made of synthetic resin, and that connector terminals of the power-supply-connector wiring part and the signal-transmission-connector wiring part, which are exposed from the connector terminal assembly, are directly connected to corresponding connectors of the power-supply circuit unit, the power-conversion circuit unit, and the control circuit unit.

2. The electric driving device as recited in claim 1, wherein:
the connector terminal assembly serves as a lid body that closes an opening of the ECU housing in which the power-supply circuit unit, the power-conversion circuit unit, and the control circuit unit are housed.

3. The electric driving device as recited in claim 2, wherein:
the power-supply circuit unit, the power-conversion circuit unit, and the control circuit unit are arranged from the lid body in that order, and electrical components of the power-supply circuit unit and the power-conversion circuit unit are mounted on a first side of each of the metal substrates by single-sided mounting, and a second side of the metal substrate of the power-supply circuit unit and a second side of the metal substrate of the power-conversion circuit unit are fixed to be opposed to each other and thermally connected to each other, the second side being opposite to the first side of each of the metal substrates.

4. The electric driving device as recited in claim 3, wherein:
the power-supply-connector wiring part is configured to extend through an insertion part formed at the metal substrate of the power-supply circuit unit and an insertion part formed at the metal substrate of the power-conversion circuit unit to the power-conversion circuit unit, and the signal-transmission-connector wiring part is configured to extend through an insertion part formed at the metal substrate of the power-supply circuit unit and an insertion part formed at the metal substrate of the power-conversion circuit unit to the control circuit unit.

5. The electric driving device as recited in claim 4, wherein:
the power-supply-connector wiring part comprises a high-voltage side connector wiring part and a low-voltage side connector wiring part, the high-voltage side connector wiring part is connected through a first insertion part formed at each of the metal substrate of the power-supply circuit unit and the metal substrate of the power-conversion circuit unit to the power-conversion circuit unit, and the low-voltage side connector wiring part is connected through a second insertion part formed at each of the metal substrate of the power-supply circuit unit and the metal substrate of the power-conversion circuit unit to the control circuit unit.

6. The electric driving device as recited in claim 5, wherein:
a portion of the high-voltage side connector wiring part other than terminals of both ends of the high-voltage side connector wiring part is embedded in the synthetic resin that forms the lid body so as to form a high-voltage side insulating region part, the high-voltage side insulating region part is positioned in the respective first insertion parts of the metal substrates, a portion of the low-voltage side connector wiring part other than terminals of both ends of the low-voltage side connector wiring part and a portion of the signal-transmission-connector wiring part other than terminals of both ends of the signal-transmission-connector wiring part are embedded in the synthetic resin that forms the lid body so as to form a low-voltage side insulating region part, and the low-voltage side insulating region part is positioned in the respective second insertion parts of the metal substrates.

7. The electric driving device as recited in claim 6, wherein:
the high-voltage side connector wiring part, the low-voltage side connector wiring part, and the signal-transmission-connector wiring part are arranged on an outer peripheral side of each of the metal substrate of the power-supply circuit unit and the metal substrate of the power-conversion circuit unit.

8. An electric power steering device constructed by an electric motor for applying a steering assist force to a steering shaft and an electronic control unit located opposite to an output shaft of the electric motor and configured to control the electric motor, the electronic control unit being equipped with an ECU housing connected to a motor housing in which the electric motor is housed and an electronic control assembly housed in the ECU housing for driving and controlling the electric motor, wherein
the electronic control assembly is divided into a power-supply circuit unit having a main function that generates a power supply and mounted on a metal substrate, a power-conversion circuit unit having a main function that drives the electric motor and mounted on a metal substrate, and a control circuit unit having a main function that controls the power-conversion circuit unit and mounted on a resin substrate, in that at least a power-supply-connector wiring part that supplies electric power from the power-supply circuit unit to the power-conversion circuit unit and the control circuit unit and a signal-transmission-connector wiring part that transmits signals to be input to or output from the control circuit unit are embedded in a connector terminal assembly made of synthetic resin, and that connector terminals of the power-supply-connector wiring part and the signal-transmission-connector wiring part, which are exposed from the connector terminal assembly, are directly connected to corresponding connectors of the power-supply circuit unit, the power-conversion circuit unit, and the control circuit unit.

9. The electric power steering device as recited in claim 8, wherein:
the connector terminal assembly serves as a lid body that closes an opening of the ECU housing in which the power-supply circuit unit, the power-conversion circuit unit, and the control circuit unit are housed.

10. The electric power steering device as recited in claim 9, wherein:
the power-supply circuit unit, the power-conversion circuit unit, and the control circuit unit are arranged from the lid body in that order, and electrical components of the power-supply circuit unit and the power-conversion circuit unit are mounted on a first side of each of the metal substrates by single-sided mounting, and a second side of the metal substrate of the power-supply circuit unit and a second side of the metal substrate of the power-conversion circuit unit are fixed to be opposed to each other and thermally connected to each other, the second side being opposite to the first side of each of the metal substrates.

11. The electric power steering device as recited in claim 10, wherein:
the power-supply-connector wiring part is configured to extend through an insertion part formed at the metal substrate of the power-supply circuit unit and an insertion part formed at the metal substrate of the power-conversion circuit unit to the power-conversion circuit unit, and the signal-transmission-connector wiring part is configured to extend through an insertion part formed at the metal substrate of the power-supply circuit unit and an insertion part formed at the metal substrate of the power-conversion circuit unit to the control circuit unit.

12. The electric power steering device as recited in claim 11, wherein:
the power-supply-connector wiring part comprises a high-voltage side connector wiring part and a low-voltage side connector wiring part, the high-voltage side connector wiring part is connected through a first insertion part formed at each of the metal substrate of the power-supply circuit unit and the metal substrate of the power-conversion circuit unit to the power-conversion circuit unit, and the low-voltage side connector wiring part is connected through a second insertion part formed at each of the metal substrate of the power-supply circuit unit and the metal substrate of the power-conversion circuit unit to the control circuit unit.

13. The electric power steering device as recited in claim 12, wherein:
a portion of the high-voltage side connector wiring part other than terminals of both ends of the high-voltage side connector wiring part is embedded in the synthetic resin that forms the lid body so as to form a high-voltage side insulating region part, the high-voltage side insulating region part is positioned in the respective first insertion parts of the metal substrates, a portion of the low-voltage side connector wiring part other than terminals of both ends of the low-voltage side connector wiring part and a portion of the signal-transmission-connector wiring part other than terminals of both ends of the signal-transmission-connector wiring part are embedded in the synthetic resin that forms the lid body so as to form a low-voltage side insulating region part, and the low-voltage side insulating region part is positioned in the respective second insertion parts of the metal substrates.

14. The electric power steering device as recited in claim 13, wherein:
the high-voltage side connector wiring part, the low-voltage side connector wiring part, and the signal-transmission-connector wiring part are arranged on an outer peripheral side of each of the metal substrate of the power-supply circuit unit and the metal substrate of the power-conversion circuit unit.

* * * * *